US010349206B2

(12) United States Patent
Baran et al.

(10) Patent No.: US 10,349,206 B2
(45) Date of Patent: *Jul. 9, 2019

(54) GEOFENCE PROFILE MANAGEMENT

(71) Applicants: AT&T Mobility II LLC, Atlanta, GA (US); AT&T Intellectual Property I, L.P., Atlanta, GA (US)

(72) Inventors: Taner Baran, Morganville, NJ (US); Catherine Wood, Arvada, CO (US); Jonathan Christiansen, Kittery Point, ME (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/851,905

(22) Filed: Dec. 22, 2017

(65) Prior Publication Data

US 2018/0124563 A1 May 3, 2018

Related U.S. Application Data

(63) Continuation of application No. 15/378,258, filed on Dec. 14, 2016, now Pat. No. 9,872,139, which is a
(Continued)

(51) Int. Cl.
*H04W 4/50* (2018.01)
*H04W 8/02* (2009.01)
(Continued)

(52) U.S. Cl.
CPC ............ *H04W 4/021* (2013.01); *H04L 67/303* (2013.01); *H04W 4/50* (2018.02); *H04W 8/02* (2013.01); *H04W 12/08* (2013.01)

(58) Field of Classification Search
CPC ........ H04W 4/021; H04W 8/02; H04L 67/303
See application file for complete search history.

(56) References Cited

U.S. PATENT DOCUMENTS 8,325,025 B2    12/2012    Morgan et al.
8,331,225 B2    12/2012    Rector et al.
(Continued)

FOREIGN PATENT DOCUMENTS

WO    WO 2012000107    1/2012

OTHER PUBLICATIONS

"Mobile Device Manager Admin Guide—Geofencing," Sep. 2013, Airwatch.
(Continued)

*Primary Examiner* — Kashif Siddiqui
(74) *Attorney, Agent, or Firm* — Hartman & Citrin LLC

(57) ABSTRACT

Concepts and technologies are disclosed herein for geofence profile management. A processor can execute a geofence profile management service. The processor can receive geofence profile data from an administrator device. The processor can create, based upon the geofence profile data, a geofence profile. The geofence profile can include a geofence profile title, a geofence profile description, and a geofence profile option. The processor can provide the geofence profile to a user device. The processor can determine that the user device accepts the geofence profile, and the processor can activate the geofence profile in response to the user device accepting the geofence profile.

20 Claims, 10 Drawing Sheets

Related U.S. Application Data continuation of application No. 14/693,286, filed on Apr. 22, 2015, now Pat. No. 9,549,287.

(51) Int. Cl.
 *H04L 29/08* (2006.01)
 *H04W 12/08* (2009.01)
 *H04W 4/021* (2018.01)

(56) References Cited

U.S. PATENT DOCUMENTS

| | | | |
|---|---|---|---|
| 8,396,488 | B2 | 3/2013 | Doyle |
| 8,725,131 | B1 | 5/2014 | Kirkham et al. |
| 8,750,895 | B2 | 6/2014 | Grosman et al. |
| 8,812,027 | B2 | 8/2014 | Obermeyer et al. |
| 8,886,178 | B2 | 11/2014 | Chatterjee |
| 9,549,287 | B2 | 1/2017 | Baran |
| 9,872,139 | B2 * | 1/2018 | Baran .................... H04W 8/02 |
| 2012/0253913 | A1 | 10/2012 | Richard |
| 2013/0310053 | A1 | 11/2013 | Srivastava |
| 2013/0324166 | A1 | 12/2013 | Mian |
| 2014/0059695 | A1 | 2/2014 | Parecki et al. |
| 2014/0128095 | A1 | 5/2014 | Finlow-Bates et al. |
| 2014/0141795 | A1 | 5/2014 | Abraham et al. |
| 2014/0162692 | A1 | 6/2014 | Li |
| 2014/0279123 | A1 | 9/2014 | Harkey |
| 2015/0057012 | A1 | 2/2015 | Hong et al. |
| 2015/0206210 | A1 | 7/2015 | Liberty |
| 2015/0278865 | A1 | 10/2015 | Jain |
| 2016/0057572 | A1 | 2/2016 | Bojorquez Alfaro |

OTHER PUBLICATIONS

U.S. Office Action dated May 9, 2016 in U.S. Appl. No. 14/693,286.
U.S. Notice of Allowance dated Aug. 26, 2016 in U.S. Appl. No. 14/693,286.
U.S. Office Action dated Feb. 16, 2017 in U.S. Appl. No. 15/378,258.
U.S. Office Action dated Jun. 12, 2017 in U.S. Appl. No. 15/378,258.
U.S. Notice of Allowance dated Aug. 29, 2017 in U.S. Appl. No. 15/378,258.

* cited by examiner

GEOFENCE PROFILE MANAGEMENT

CROSS-REFERENCE TO RELATED APPLICATIONS

This application is a continuation of and claims priority to U.S. patent application Ser. No. 15/378,258, entitled "Geofence Profile Management," filed Dec. 14, 2016, now, U.S. Pat. No. 9,872,139, which is incorporated herein by reference in its entirety; and which is a continuation of and claims priority to U.S. patent application Ser. No. 14/693,286, entitled "Geofence Profile Management," filed Apr. 22, 2015, now U.S. Pat. No. 9,549,287, which is incorporated herein by reference in its entirety.

BACKGROUND

Some mobile devices today can be equipped with a variety of sensors that can be used to identify locations of the mobile devices. Because some users may carry their mobile devices frequently, including at times when the users may be at work or in proximity to a company network, some companies may wish to provide the ability to users to access corporate resources on their mobile devices. To make this access safe, however, the company may wish to enforce policies depending on the location of the mobile device in an attempt to prevent unauthorized access to the company network.

Some companies, for example, may wish to restrict access to company email within certain defined work locations only and not outside those locations. At the same time, companies may wish to respect a user's location privacy when the user is offsite (e.g., away from the company location). Because of various privacy concerns, these needs may be more pronounced and may keep some companies from allowing some users to access the company network.

SUMMARY

The present disclosure is directed to geofence profile management. A geofence profile management service can be hosted or executed by a server computer. The geofence profile management service can be interacted with by a user or other entity (e.g., an administrator operating an administrator device) to submit geofence profile data. The geofence profile data can be obtained by the geofence profile management service and used by the geofence profile management service to generate one or more geofence profiles. The geofence profiles can be relevant to one or more users, accounts, devices, or the like. In some example embodiments, the geofence profiles can be relevant to a user device that may be associated with a user or account.

The geofence profile management service can, after creation of a particular geofence profile that is relevant to a particular user device, provide geofence profile management data to the user device. The geofence profile management data can include one or more geofence profiles, preferences and/or settings associated with the geofence profiles, privacy data that may relate to the geofence profiles, and/or other information. The user device can, via execution of the geofence profile management application, present one or more user interfaces or screen displays to obtain, from a user or other entity associated with the user device, a privacy indication relating to the geofence profile associated with the geofence profile management. Thus, for example, the user device can obtain information indicating if the user or other entity opts-in to use the geofence profile, opts-out of using the geofence profile, adds or removes limitations relating to the geofence profile, combinations thereof, or the like.

The user device can provide geofence profile management data to the server computer (and/or the geofence profile management service executed and/or hosted thereby). The geofence profile management data provided by the user device can include privacy data (e.g., an indication whether the user device has opted-in to or opted-out of use of the associated geofence profile), preferences or settings, other information, or the like. The user device can track location of the user device and determine when the user device enters into or leaves boundaries associated with a particular geofence profile. If the user device enters into or leaves boundaries associated with a geofence corresponding to a geofence profile, the user device can determine, based upon the geofence profile management data, if an alert, warning, indicator, or other information should be presented at the user device. The user device can trigger presentation of the alert, warning, indicator, or the like if such presentation is determined to be desirable or required. The user device can also update the geofence profile from time to time and/or opt out of using the geofence profile at any time in response to user input. These and other aspects of creating geofence profiles and using geofence profiles will be illustrated and described in more detail below.

According to one aspect of the concepts and technologies disclosed herein, a method is disclosed. The method can include receiving, at a processor executing a geofence profile management service, geofence profile data from an administrator device; creating, by the processor and based upon the geofence profile data, a geofence profile including a geofence profile title, a geofence profile description, and a geofence profile option; providing, by the processor, the geofence profile to a user device; determining, by the processor, that the user device accepts the geofence profile; and activating, by the processor, the geofence profile in response to the user device accepting the geofence profile.

In some embodiments, determining that the user device accepts the geofence profile includes receiving, from the user device, data indicating an opt-in decision at the user device. In some embodiments, the user device obtains the opt-in decision by presenting a prompt at the user device, the prompt including a first user control that corresponds to a first option to opt-in to use of the geofence profile and a second user control that corresponds to a second option to opt-out of use of the geofence profile; and obtaining, via the prompt, input indicating one of the first option to opt-in and the second option to opt-out. In some embodiments, the user device presents a geofence indicator that indicates that the user device is within boundaries of a geofence that corresponds to the geofence profile. In some embodiments, the user device presents a geofence indicator that indicates that the user device is outside boundaries of a geofence that corresponds to the geofence profile. In some embodiments, the user device presents a geofence indicator that indicates that the user device is outside of boundaries associated with any geofence and is not being monitored. In some embodiments, activating the geofence profile includes instructing the user device to begin use of the geofence profile.

In some embodiments, the user device tracks location and applies the geofence profile based upon the location tracked. In some embodiments, the method also can include receiving, from the user device, user input; and updating the geofence profile based upon the user input. In some embodiments, the geofence profile title includes a name for the geofence profile, the geofence profile description includes text provided to a user to obtain an opt-in decision relating to the geofence profile, and the geofence profile option includes an option to display an alert when the user device enters boundaries associated with a geofence that corresponds to the geofence profile.

According to another aspect of the concepts and technologies disclosed herein, a system is disclosed. The system can include a processor and a memory. The memory can store computer-executable instructions that, when executed by the processor, cause the processor to perform operations. The operations can include receiving geofence profile data from an administrator device; creating, based upon the geofence profile data, a geofence profile including a geofence profile title, a geofence profile description, and a geofence profile option; providing the geofence profile to a user device; determining that the user device accepts the geofence profile; and activating the geofence profile in response to the user device accepting the geofence profile.

In some embodiments, determining that the user device accepts the geofence profile includes receiving, from the user device, data indicating an opt-in decision at the user device. In some embodiments, the user device obtains the opt-in decision by presenting a prompt at the user device, the prompt including a first user control that corresponds to a first option to opt-in to use of the geofence profile and a second user control that corresponds to a second option to opt-out of use of the geofence profile; and obtaining, via the prompt, input indicating one of the first option to opt-in and the second option to opt-out.

In some embodiments, the user device presents a geofence indicator that indicates one of a first indication that the user device is within boundaries of a geofence that corresponds to the geofence profile, a second indication that the user device is outside boundaries of the geofence, and a third indication that the user device is outside of boundaries associated with any geofence and is not being monitored. In some embodiments, the geofence profile title includes a name for the geofence profile, wherein the geofence profile description includes text provided to a user to obtain an opt-in decision relating to the geofence profile, and wherein the geofence profile option includes an option to display an alert when the user device enters boundaries associated with a geofence that corresponds to the geofence profile.

According to yet another aspect, a computer storage medium is disclosed. The computer storage medium can have computer-executable instructions stored thereon that, when executed by a processor, cause the processor to perform operations. The operations can include receiving geofence profile data from an administrator device; creating, based upon the geofence profile data, a geofence profile including a geofence profile title, a geofence profile description, and a geofence profile option; providing the geofence profile to a user device; determining that the user device accepts the geofence profile; and activating the geofence profile in response to the user device accepting the geofence profile.

In some embodiments, determining that the user device accepts the geofence profile includes receiving, from the user device, data indicating an opt-in decision at the user device. In some embodiments, the user device obtains the opt-in decision by presenting a prompt at the user device, the prompt including a first user control that corresponds to a first option to opt-in to use of the geofence profile and a second user control that corresponds to a second option to opt-out of use of the geofence profile; and obtaining, via the prompt, input indicating one of the first option to opt-in and the second option to opt-out.

In some embodiments, the user device presents a geofence indicator that indicates one of a first indication that the user device is within boundaries of a geofence that corresponds to the geofence profile, a second indication that the user device is outside boundaries of the geofence, and a third indication that the user device is outside of boundaries associated with any geofence and is not being monitored. In some embodiments, the geofence profile title includes a name for the geofence profile, wherein the geofence profile description includes text provided to a user to obtain an opt-in decision relating to the geofence profile, and wherein the geofence profile option includes an option to display an alert when the user device enters boundaries associated with a geofence that corresponds to the geofence profile.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
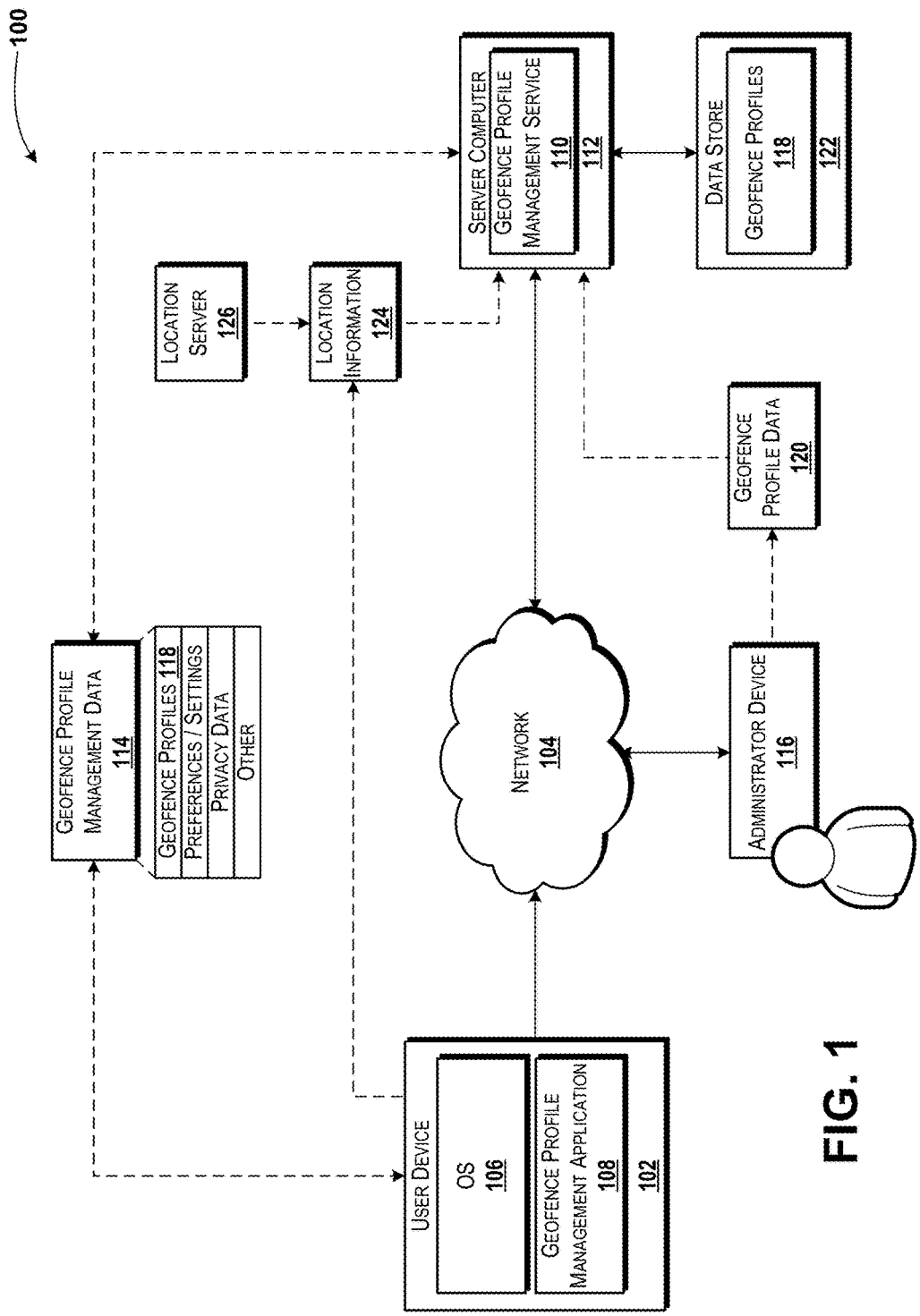
FIG. 1 is a system diagram illustrating an illustrative operating environment for various embodiments of the concepts and technologies described herein.

The following detailed description is directed to geofence profile management. A geofence profile management service can be hosted or executed by a server computer. The geofence profile management service can be interacted with by a user or other entity (e.g., an administrator operating an administrator device) to submit geofence profile data. The geofence profile data can be obtained by the geofence profile management service and used by the geofence profile management service to generate one or more geofence profiles. The geofence profiles can be relevant to one or more users, accounts, devices, or the like. In some example embodiments, the geofence profiles can be relevant to a user device that may be associated with a user or account.

The geofence profile management service can, after creation of a particular geofence profile that is relevant to a particular user device, provide geofence profile management data to the user device. The geofence profile management data can include one or more geofence profiles, preferences and/or settings associated with the geofence profiles, privacy data that may relate to the geofence profiles, and/or other information. The user device can, via execution of the geofence profile management application, present one or more user interfaces or screen displays to obtain, from a user or other entity associated with the user device, a privacy indication relating to the geofence profile associated with the geofence profile management. Thus, for example, the user device can obtain information indicating if the user or other entity opts-in to use the geofence profile, opts-out of using the geofence profile, adds or removes limitations relating to the geofence profile, combinations thereof, or the like.

The user device can provide geofence profile management data to the server computer (and/or the geofence profile management service executed and/or hosted thereby). The geofence profile management data provided by the user device can include privacy data (e.g., an indication whether the user device has opted-in to or opted-out of use of the associated geofence profile), preferences or settings, other information, or the like. The user device can track location of the user device and determine when the user device enters into or leaves boundaries associated with a particular geofence profile. If the user device enters into or leaves boundaries associated with a geofence corresponding to a geofence profile, the user device can determine, based upon the geofence profile management data, if an alert, warning, indicator, or other information should be presented at the user device. The user device can trigger presentation of the alert, warning, indicator, or the like if such presentation is determined to be desirable or required. The user device can also update the geofence profile from time to time and/or opt out of using the geofence profile at any time in response to user input. These and other aspects of creating geofence profiles and using geofence profiles will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for geofence profile management will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, smartphones, tablet computers, laptop computers, smart watches, set-top boxes, vehicle computing systems, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a geofence profile management application 108. The operating system 106 can be a computer program for controlling the operation of the user device 102. The geofence profile management application 108 can be an executable program configured to execute on top of the operating system 106 to provide various functions as illustrated and described herein for geofence profile management. Because the application programs can include other applications that are generally understood (e.g., mail programs, messaging programs, web browsing programs, standalone applications, combinations thereof, or the like), the example embodiment shown in FIG. 1 should not be construed as being limiting in any way the concepts and technologies described herein.

The geofence profile management application 108 can be configured to manage one or more geofence profiles associated with the user device 102 and/or to interface with other entities to manage (or effect management of) the one or more geofence profiles. In the illustrated embodiment, the geofence profile management application 108 can interact with an application, program, module, service, or other software such as a geofence profile management service 110. The geofence profile management service 110 can be a callable service executed and/or hosted by a computing device such as a server computer 112.

The geofence profile management application 108 and the geofence profile management service 110 can be configured to exchange various types of information with one another to effect geofence profile management in accordance with the concepts and technologies described herein. According to various embodiments, the geofence profile management application 108 and the geofence profile management service 110 can exchange one or more instances of geofence profile management data 114 with one another. The geofence profile management data 114 will be illustrated and described in more detail below.

The geofence profile management service 110 also can be configured to interface with other devices such as, for example, an administrator device 116. The functionality of the administrator device 116 can be provided, in some embodiments, by a personal computer, smartphone, server computer, tablet computer, or the like. The administrator device 116 can be used by an entity such as a user, network operator, an administrator, or the like to create one or more geofence profiles 118. In some embodiments, the administrator device 116 can create the geofence profiles 118 by submitting to (or exchanging with) the geofence profile management service 110 one or more instances of geofence profile data 120.

As shown in FIG. 1, the geofence profiles 118 can be stored in a data storage device such as a database, a data server, a mass data storage device, or the like ("data store") 122. In the embodiment shown in FIG. 1, the functionality of the data store 122 can be provided by one or more databases, data storage device, server computers, desktop computers, mobile telephones, laptop computers, other computing systems, and the like. For purposes of illustrating and describing the various embodiments of the concepts and technologies described herein, the data store 122 is illustrated and described herein as data hosted by a server computer 112. It should be understood that this example is illustrative and therefore should not be construed as being limiting in any way.

The geofence profile management service 110 also can be configured to track a geographic location associated with the user device 102. According to various embodiments, the geofence profile management service 110 can obtain location information 124. The location information 124 can specify a current location of the user device 102 and can be obtained from various entities. In some embodiments, for example, the location information 124 can be provided by the user device 102, while in some other embodiments, the location information 124 can be provided by a location based services ("LBS") device such as a location server 126. Because the location of the user device 102 can be determined in additional and/or alternative ways, it should be understood that this example is illustrative and therefore should not be construed as being limiting in any way.

Since the elements of the operating environment 100 have been briefly described, some embodiments of the concepts and technologies described herein will now be described in detail. As noted above, the geofence profile management application 108 can be used to apply a geofence profile 118 at the user device 102. Thus, the geofence profile management application 108 can extract, from the geofence profile management data 114, one or more geofence profiles 118. According to some embodiments of the concepts and technologies described herein, the geofence profile management application 108 can apply the geofence profiles 118 at the user device 102 based upon location of the user device 102. Thus, as will be explained in more detail herein, tracking within particular geofence boundaries can be performed by the user device 102 without involvement from the geofence profile management service 110 and/or the administrator device 116, thereby enhancing the perceived privacy of the tracking performed in accordance with embodiments of the concepts and technologies described herein. It should be understood that this example is illustrative and therefore should not be construed as being limiting in any way.

To provide the functionality illustrated and described herein, the geofence profile management application 108 and the geofence profile management service 110 can exchange the geofence profile management data 114, as noted above. The geofence profile management data 114 can include, but is not limited to, one or more geofence profiles 118, preferences and/or settings (labeled as "preferences/settings" in FIG. 1), privacy data, other information, combinations thereof, or the like. According to various embodiments of the concepts and technologies described herein, multiple geofence profiles 118 can apply at a particular time and/or can be used at a particular device (e.g., the user device 102). Thus, for example, a user device 102 may be within two or more geofences associated with two or more geofence profiles 118 at a given time and both geofence profiles 118 may therefore be applied. For example, a user device 102 may be within a first geofence profile 118 for "company property" and a second geofence profile 118 for "Building A," for example. In such an example, both geofence profiles 118 can be applied and/or used with respect to the user device 102. It should be understood that this example is illustrative and therefore should not be construed as being limiting in any way.

The geofence profiles 118 can include various types of information. According to various aspects of the concepts and technologies described herein, each of the geofence profiles 118 can include boundary data that defines geographic boundaries of an area to be encompassed by a geofence. Thus, for example, if a geofence profile 118 is created for an office location, the geofence profile 118 can include boundary data. Boundary data can define a geographic area or region that corresponds to the office location. Thus, for example, the boundary data can define three or more coordinates (e.g., GPS coordinates) such that imaginary lines drawn between the three or more coordinates can define an area bound by the boundaries. It should be understood that other types of boundary data can be included such as, for example, street names such that an area associated with a geofence profile 118 can be bound by roads or streets, etc. Because various approaches for defining bound areas and/or boundaries of areas are generally well understood, these examples should be understood as being illustrative and should not be construed as being limiting in any way.

The geofence profiles 118 also can specify actions, events, privileges, capabilities, triggers, and the like, which may apply when a user or device enters or leaves a geofence associated with a geofence profile 118. These actions, events, privileges, capabilities, triggers, and the like can be tailored by administrators when creating a geofence profile 118. Thus, when a user device 102 enters or leaves a geofence associated with a geofence profile 118, the administrator (or other entity) can be notified, in some embodiments. In some other embodiments, the user device 102 can log in or log out of a company portal when entering or leaving a geofence associated with a geofence profile 118. In some other embodiments, document, application, or other resource usage privileges can be granted or revoked when the user device 102 enters or leaves a geofence associated with a geofence profile 118. Thus, the geofence profiles 118 can be used to protect company resources by enabling or disabling certain functions, functionality, privileges, capabilities, or the like, when a user device 102 enters or leaves a geofence associated with a geofence profile 118. Because other actions, events, privileges, capabilities, triggers, and the like are possible, it should be understood that these examples are illustrative and therefore should not be construed as being limiting in any way.

The geofence profile management data 114 also can include one or more preferences or settings (labeled as "preferences/settings" in FIG. 1). The preferences and/or settings can define various options associated with the geofence profiles 118. Thus, according to various embodiments the preferences and settings can include data representing an option to enable or disable the geofence profile 118, an option to notify users when they enter into or leave a boundary associated with a geofence profile 118, an option to display a message or alert on a screen associated with a user device (e.g., the user device 102) when the device enters into or leaves a geofence associated with a geofence profile 118, an option to display an indicator when within a geofence associated with a geofence profile 118, an option to display an indicator when outside of all geofences, combinations thereof, or the like. Additional and/or alternative options can be included, in some embodiments, and as such, the above examples should not be construed as being limiting in any way.

The geofence profile management data 114 also can include privacy data. The privacy data can include one or more options, settings, configurations, or the like, for managing or specifying one or more privacy settings for a particular user, device, account, or the like. Thus, for example, the privacy data can define whether a user or other entity opts-in (e.g., accepts) a particular geofence profile 118, whether a user or other entity opts-out (e.g., rejects) a particular geofence profile 118, locations at which all tracking of a particular device associated with an entity or user is disabled, times at which all tracking of a particular device associated with an entity or user is disabled, combinations thereof, or the like. Thus, the privacy data can be used to ensure that all tracking of any activity at a particular device (e.g., the user device 102) is explicitly accepted by a user or other entity via an opt-in process. Because other privacy data can be included with the geofence profile management data 114, it should be understood that the above examples are illustrative and therefore should not be construed as being limiting in any way.

The geofence profile management data 114 also can include other data and/or information (labeled as "other" in FIG. 1). The other information can include various types of information associated with the geofence profiles 118 such as, for example, a profile name, a user associated with the profile, a profile description, time information (e.g., times during which the geofence profile 118 is active and/or times during which the geofence profile 118 is inactive), and the like. Because other information can be included with and/or as part of the geofence profiles 118, it should be understood that these examples are illustrative and therefore should not be construed as being limiting in any way.

As shown in FIG. 1, the geofence profile management data 114 can be provided to the user device 102 by the server computer 112 and/or provided by the user device 102 to the server computer 112. Thus, it can be appreciated that the geofence profiles 118, preferences and/or settings, privacy data, and/or other information can be provided to the user device 102 by the server computer 112, and that the user device 102 can provide updated, new, or changed preferences and/or settings, privacy data, and/or other information to the server computer 112.

In some embodiments, the user device 102 can capture its geographic location at various times and/or time intervals. In some embodiments, the user device 102 can determine its geographic location every second, every minute, every five minutes, or the like. In some embodiments, the user device 102 can receive location information 124 from a location server 126 (or other device), while in some other embodiments the user device 102 can generate the location information 124 and/or use knowledge of the currently location without explicitly generating location information 124. The user device 102 can use knowledge of its location to enforce one or more geofence profiles 118 at the user device 102 without any interactions with the geofence profile management service 110. Thus, contrary to some other technologies for tracking information within certain locations, the concepts and technologies described herein can enable enforcement of geofence profiles 118 to enable/disable tracking at the device being tracked (e.g., the user device 102), thereby ensuring security and buy-in by those whose activity is being tracked.

In some other embodiments, the geofence profile management service 110 can be configured to enforce geofence profiles 118 to enable and/or disable tracking of activity at the user device 102. As shown in FIG. 1, the location information 124 can be obtained at the geofence profile management service 110 from the location server 126 and/or from the user device 102 or other device being tracked. Thus, some embodiments of the concepts and technologies described herein enable the geofence profile management service 110 to track location of the user device 102 with or without any involvement from the user device 102.

As explained above, the geofence profiles 118 can be generated by the geofence profile management service 110 via one or more interactions with an administrator device 116 and/or other devices. As shown in FIG. 1, the administrator device 116 can submit geofence profile data 120 to the geofence profile management service 110, and the geofence profile management service 110 can create the geofence profiles 118 based upon the geofence profile data 120. It should be understood that this example is illustrative and therefore should not be construed as being limiting in any way. Thus, it can be appreciated that the geofence profile data 120 can include one or more data points for defining boundaries of a geofence associated with a geofence profile 118, one or more preferences and/or settings, one or more instances of privacy data, other information, or the like.

According to various embodiments of the concepts and technologies described herein, the geofence profile management service 110 can be configured to support a portal, application, or other functionality that can enable an entity (e.g., an administrator, user, or the like) to create the geofence profiles 118 by interacting with one or more user interfaces ("UIs"). Thus, while the geofence profile data 120 is shown as being submitted by the administrator device 116 to the geofence profile management service 110, it should be understood that the geofence profile management service 110 can obtain the geofence profile data 120 via a web portal or other functionality. An example user interface that can be presented at the administrator device 116 or elsewhere for interacting with a portal, web page, application, or the like to create the geofence profile data 120 will be illustrated and described below in FIG. 4A. It should be understood that this example is illustrative and therefore should not be construed as being limiting in any way.

In practice, the geofence profile management service 110 can be hosted or executed by the server computer 112. The geofence profile management service 110 can be interacted with by a user or other entity (e.g., an administrator operating an administrator device 116) to submit geofence profile data 120. The geofence profile data 120 can be obtained by the geofence profile management service 110 and used by the geofence profile management service 110 to generate one or more geofence profiles 118. The geofence profiles 118 can be relevant to one or more users, accounts, devices, or the like, for example the user device 102.

The geofence profile management service 110 can, after creation of a particular geofence profile 118 that is relevant to a particular user device 102, provide geofence profile management data 114 to the user device 102. The geofence profile management data 114 can include one or more geofence profiles 118, preferences and/or settings, privacy data, and/or other information. The user device 102 can, via execution of the geofence profile management application 108, present one or more user interfaces or screen displays to obtain, from a user or other entity associated with the user device 102, a privacy indication relating to the geofence profile 118 associated with the geofence profile management data 114. Thus, for example, the user device 102 can obtain information indicating if the user or other entity opts-in to use the geofence profile 118, opts-out of using the geofence profile 118, adds or removes limitations relating to the geofence profile 118, combinations thereof, or the like.

The user device 102 can provide geofence profile management data 114 to the server computer 112 (and/or the geofence profile management service 110 executed and/or hosted thereby). The geofence profile management data 114 provided by the user device 102 can include privacy data (e.g., an indication whether the user device 102 has opted-in to use the associated geofence profile 118), preferences or settings, other information, or the like. The user device 102 also can begin tracking of location of the user device 102 to apply the geofence profile 118 at the user device 102.

In applying the geofence profile 118, the user device 102 can track location of the user device 102 and determine when the user device 102 enters into or leaves boundaries associated with a particular geofence profile 118. If the user device 102 enters into or leaves boundaries associated with a particular geofence profile 118, the user device 102 can determine, based upon the geofence profile management data 114, if an alert, warning, indicator, or other information should be displayed at the user device 102. The user device 102 can trigger display of the alert, warning, indicator, or the like if such display is determined to be desirable or required. The user device 102 can also update the geofence profile 118 from time to time and/or opt out of using the geofence profile 118 at any time in response to user input. These and other aspects of creating geofence profiles 118 and using geofence profiles 118 will be illustrated and described in more detail below.

FIG. 1 illustrates one user device 102, one network 104, one server computer 112, one administrator device 116, one data store 122, and one location server 126. It should be understood, however, that various implementations of the operating environment 100 can include zero, one, or more than one user device 102; zero, one, or more than one network 104; zero, one, or more than one server computer 112; zero, one, or more than one administrator device 116; zero, one, or more than one data store 122; and zero, one, or more than one location server 126. As such, the illustrated embodiment should be understood as being illustrative, and should not be construed as being limiting in any way.

Figure 2:
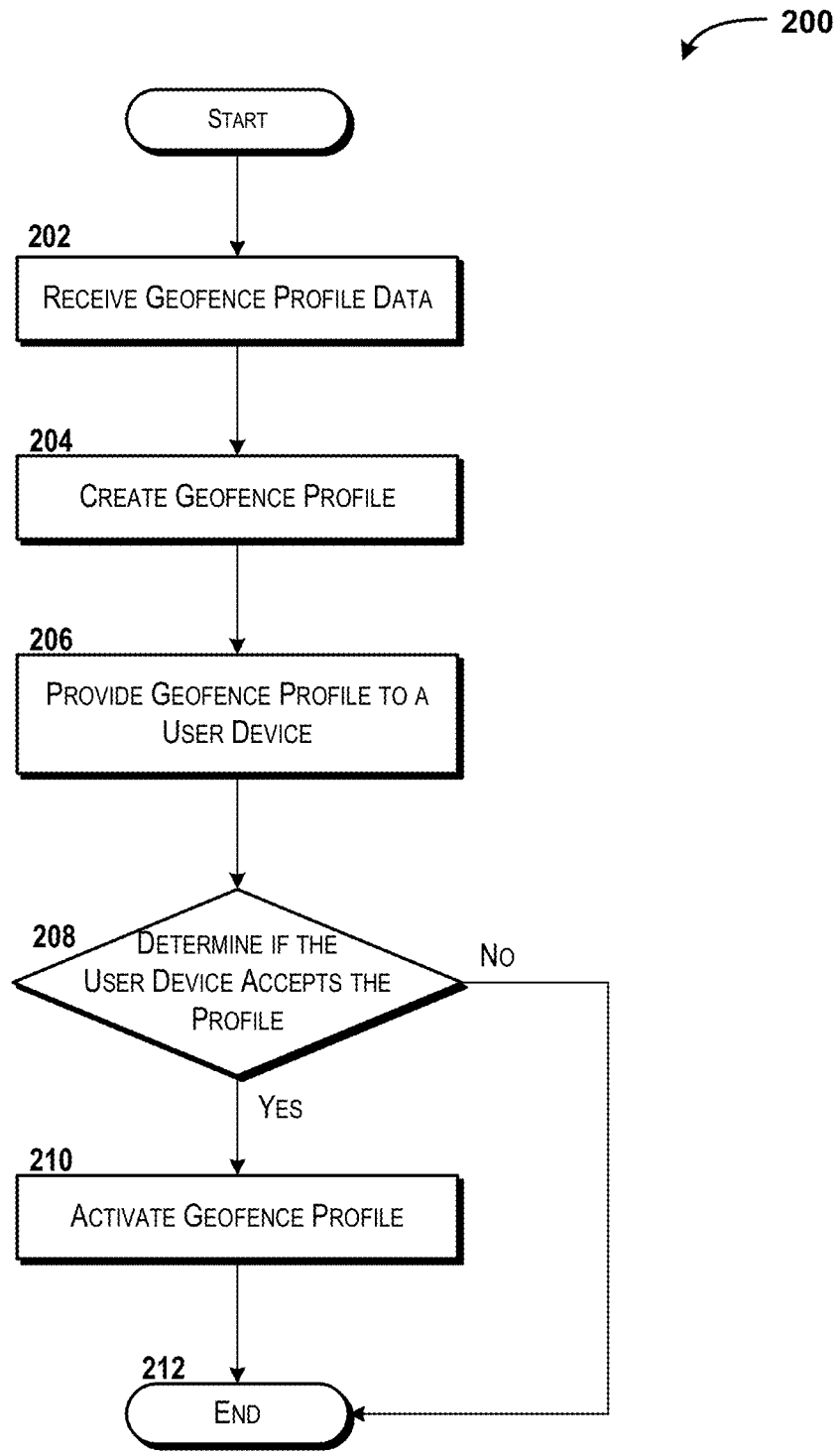
FIG. 2 is a flow diagram showing aspects of a method for creating a geofence profile, according to an illustrative embodiment of the concepts and technologies described herein.

Turning now to FIG. 2, aspects of a method 200 for creating a geofence profile will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the server computer 112, the administrator device 116, or other devices, to perform one or more operations and/or causing the processor to direct other components of the computing system or device to perform one or more of the operations.

For purposes of illustrating and describing the concepts of the present disclosure, the method 200 is described as being performed by the server computer 112 via execution of one or more software modules such as, for example, the geofence profile management service 110. It should be understood that additional and/or alternative devices and/or network nodes can provide the functionality described herein via execution of one or more modules, applications, and/or other software including, but not limited to, the geofence profile management service 110. Thus, the illustrated embodiment of the method 200 should be understood as being illustrative, and should not be viewed as being limiting in any way.

The method 200 begins at operation 202. At operation 202, the server computer 112 can receive geofence profile data such as the geofence profile data 120 illustrated and described above with reference to FIG. 1. Operation 202 can include authentication, initiation of a session, and the like.

From operation 202, the method 200 proceeds to operation 204. At operation 204, the server computer 112 can create a geofence profile 118. In some embodiments, the server computer 112 can create the geofence profile 118 based upon the data received in operation 202. As such, it can be appreciated that the server computer 112 can create the geofence profile 118 based upon the geofence profile data 120, though this is not necessarily the case.

As explained above, the geofence profile data 120 can include boundary data, privacy information, user information, time information, combinations thereof, or the like. Thus, it can be appreciated that the geofence profile 118 created in operation 204 can specify one or more users, devices, or accounts that will be monitored in accordance with the geofence profile 118; privacy settings or options associated with the geofence profile 118; a title for the geofence profile 118; a description of the geofence profile 118; one or more time limitations associated with the geofence profile 118 (e.g., times at which the geofence profile 118 applies or does not apply to a particular user, device, or account); privacy considerations associated with the geofence profile 118; alert, notification, and/or indication options associated with the geofence profile 118; combinations thereof; or the like. Thus, the server computer 112 can create the geofence profile 118 and associate these and other types of data with the geofence profile 118 and/or include these and/or other types of data as part of the geofence profile 118. It should be understood that this example is illustrative and therefore should not be construed as being limiting in any way.

From operation 204, the method 200 proceeds to operation 206. At operation 206, the server computer 112 can provide the geofence profile 118 created in operation 204 to a user device such as the user device 102. As explained above with reference to FIG. 1, the geofence profile 118 can be provided to the user device 102 as part of (or as) the geofence profile management data 114. Thus, while not separately shown in FIG. 2, it should be understood that the geofence profile 118 can be provided to the user device 102 with preferences and/or settings, privacy information, and/or other information as illustrated and described herein. The geofence profile management data 114 can include instructions for prompting the user device 102 to opt-in to using the geofence profile 118 and/or to opt-out of using the geofence profile 118. The user device 102 can, via execution of the geofence profile management application 108, obtain the opt-in or opt-out decisions of the user or other entity associated with the user device 102 and provide the opt-in or opt-out decision to the server computer 112.

From operation 206, the method 200 proceeds to operation 208. At operation 208, the server computer 112 can determine if the user device 102 accepts the geofence profile 118 provided to the user device 102 in operation 206. As noted above, the user device 102 can prompt a user or other entity for an opt-in or opt-out decision and provide the decision to the server computer 112. Thus, operation 208 can correspond to the server computer 112 determining if the user device 102 has opted-in or opted-out. Because the server computer 112 can determine that the user device 102 has accepted the geofence profile 118 in additional and/or alternative manners, it should be understood that this example is illustrative and therefore should not be construed as being limiting in any way.

If the server computer determines, in operation 208, that the user device 102 has accepted the geofence profile 118, the method 200 can proceed to operation 210. At operation 210, the server computer 112 can activate the geofence profile 118. As noted above, the user device 102 can be configured, via execution of the geofence profile management application 108, to enforce and/or use the geofence profile 118 (as opposed to the geofence profile management service 110). As such, operation 210 can correspond to the server computer 112 informing the user device 102 that the geofence profile 118 should be used and/or activated. It should be understood that operation 210 also can include the user device 102 informing the server computer 112 that the user device 102 has activated the geofence profile 118, and as such, the server computer 112 may or may not actively take part in activating the geofence profile 118. If the geofence profile management service 110 is configured to apply the geofence profile 118, operation 210 can correspond to the server computer 112 analyzing the geofence profile 118 to determine if activity associated with the user device 102 should be tracked or monitored. Because the geofence profile 118 can be activated in additional and/or alternative manners, it should be understood that these examples are illustrative and therefore should not be construed as being limiting in any way.

From operation 210, the method 200 proceeds to operation 212. The method 200 also can proceed to operation 212 if the server computer 112 determines, in operation 208, that the user device 102 has not accepted the geofence profile 118. The method 200 ends at operation 212.

Figure 3:
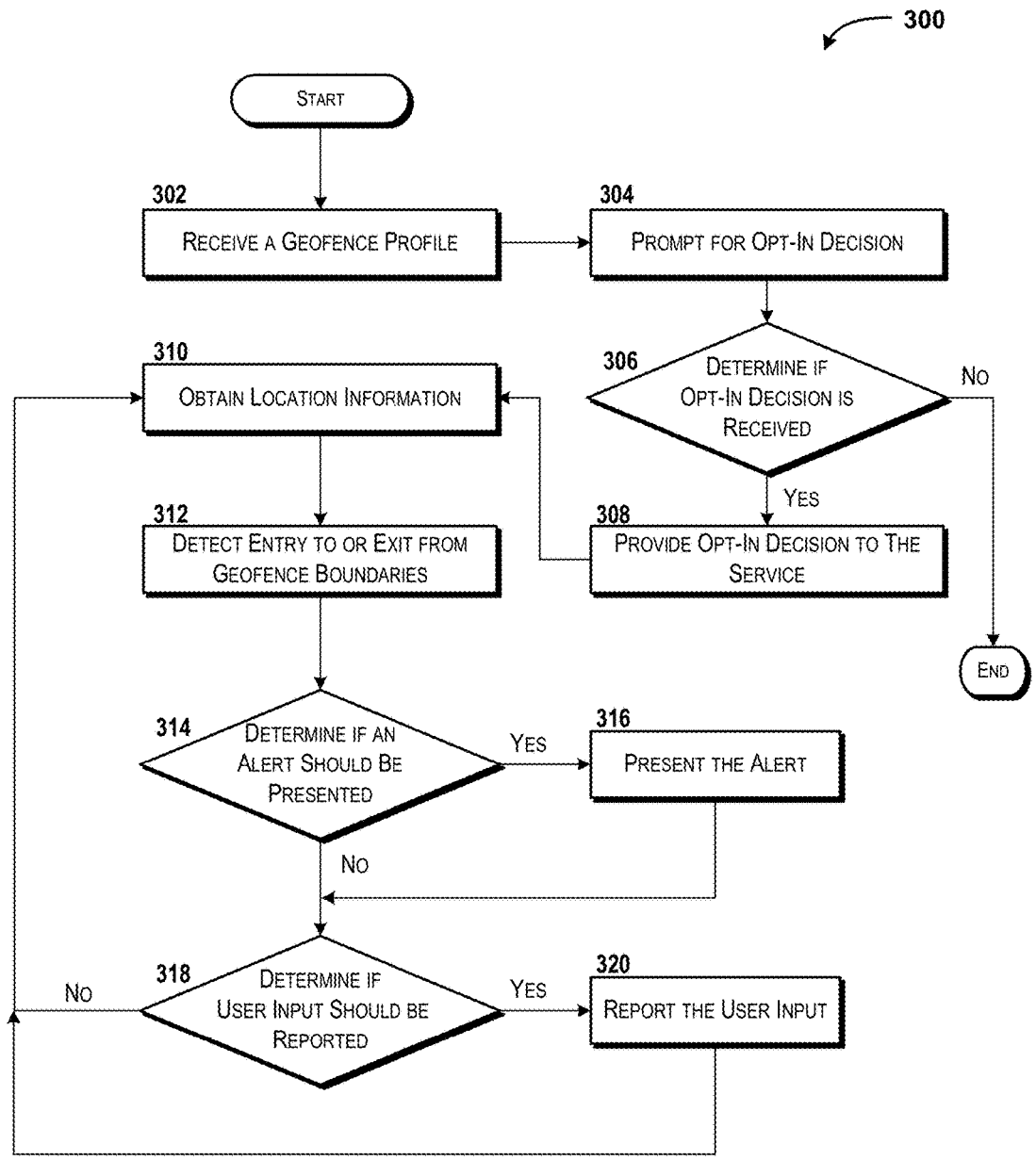
FIG. 3 is a flow diagram showing aspects of a method for applying a geofence profile to activity at a user device, according to an illustrative embodiment of the concepts and technologies described herein.

Turning now to FIG. 3, aspects of a method 300 for applying a geofence profile 118 to activity at a user device 102 will be described in detail, according to an illustrative embodiment. For purposes of illustrating and describing the concepts of the present disclosure, the method 300 is described as being performed by the user device 102 via execution of one or more software modules such as, for example, the geofence profile management application 108. It should be understood that additional and/or alternative devices can provide the functionality described herein via execution of one or more modules, applications, and/or other software including, but not limited to, the geofence profile management application 108. Thus, the illustrated embodiment of the method 300 should be understood as being illustrative, and should not be viewed as being limiting in any way.

The method 300 begins at operation 302. At operation 302, the user device 102 can receive a geofence profile 118. As explained above with reference to FIGS. 1-2, the user device 102 can receive the geofence profile 118 as a part of (or as) the geofence profile management data 114. Thus, although not shown separately in FIG. 3, the user device 102 can parse the geofence profile management data 114 to identify the geofence profile 118 and/or otherwise recognize the geofence profile 118 as part of, or being included with, the geofence profile management data 114. Regardless of how the geofence profile 118 is received, operation 302 can correspond to the user device 102 recognizing the geofence profile 118 and storing the geofence profile 118 locally for use and/or application at the user device 102.

From operation 302, the method 300 proceeds to operation 304. At operation 304, the user device 102 can prompt for an opt-in decision relating to the geofence profile 118 obtained in operation 302. Thus, for example, the user device 102 can generate a prompt requesting a user or other entity to opt-in or opt-out of using the geofence profile 118. An example prompt for requesting an opt-in or opt-out decision is illustrated and described in more detail below with reference to FIG. 4A. Because other types of prompts and/or displays can be generated in accordance with the concepts and technologies described herein, it should be understood that this example is illustrative and therefore should not be construed as being limiting in any way.

From operation 304, the method 300 proceeds to operation 306. At operation 306, the user device 102 can determine if an opt-in decision has been received or detected at the user device 102. Thus, for example, the user device 102 can determine if an option to opt-in has been detected, if an option to opt-out has been detected, if no input has been detected, if other input has been detected, or the like. If the user device 102 determines, in operation 306, that the opt-in decision has not be received (or if an opt-out decision has been received), the method 300 can end and performance of the method 300 can terminate. If the user device 102 determines, in operation 306, that the opt-in decision has been detected, the method 300 can proceed to operation 308.

At operation 308, the user device 102 can provide the opt-in decision (or data reflecting the opt-in decision) to the server computer 112 and/or the geofence profile management service 110 executed and/or hosted thereby. Thus, the user device 102 can inform the server computer 112 and/or the geofence profile management service 110 that the user device 102 has opted in to use the geofence profile 118 obtained in operation 302. It should be understood that this example is illustrative and therefore should not be construed as being limiting in any way.

From operation 308, the method 300 proceeds to operation 310. At operation 310, the user device 102 can obtain location information. According to various embodiments, the location information obtained in operation 310 can describe a geographic location of the user device 102 at a particular time (e.g., the current time). The geographic location can be represented by location information 124 and therefore can be generated at the user device 102 (e.g., via an onboard location determination device such as a global positioning system ("GPS") chip, proximity to wireless networks, knowledge of a tower or radio to which the user device 102 is connected, or the like) and/or obtained from external devices (e.g., a location server 126 or the like).

It should be appreciated that the user device 102 can perform operation 310 multiple times. Thus, though not shown in FIG. 3, the flow of the method 300 can pause at operation 310 (or repeat operation 310) until the user device 102 detects movement of the user device 102 into or out of boundaries associated with a geofence (e.g., a geofence associated with the geofence profile 118 received or otherwise obtained in operation 302). Thus, although not shown in FIG. 3, the execution of the method 300 can flow through operation 310 and back multiple times before the flow continues to operation 312. Thus, it should be understood that the illustrated embodiment is illustrative and should not be construed as being limiting in any way.

From operation 310, the method 300 proceeds to operation 312. At operation 312, the user device 102 can detect entry to or exit from geofence boundaries. In some embodiments, the user device 102 can detect, in operation 312, that the user device 102 has moved into boundaries associated with a geofence described by the geofence profile 118 received (or otherwise obtained) in operation 302. In some other embodiments, the user device 102 can detect, in operation 312, that the user device 102 has moved out of the boundaries associated with a geofence described by the geofence profile 118 received (or otherwise obtained) in operation 302.

From operation 312, the method 300 proceeds to operation 314. At operation 314, the user device 102 can determine if an alert should be presented. As used herein to refer to an alert, "present" can include displaying a visual indicator such as a user interface display, icon, alert window, or the like; flashing or otherwise activating a light emitting diode ("LED") or other visible light device associated with the user device; playing an audible sound or signal; activating a tactile device such as a vibrating alert device; combinations thereof, or the like. Thus, "present" can include providing the alert in any manner that is perceptible by a user or other entity associated with the user device 102. Additionally, as used herein the term "alert" can include an indicator of any type such as a splash screen, a warning screen, an icon, a shield, or the like. As such, it can be appreciated that operation 314 can include determining if a user or other entity associated with the user device 102 should be informed in almost any manner regarding entering into or exiting from the geofence boundaries. It should be understood that these examples are illustrative and therefore should not be construed as being limiting in any way.

If the user device 102 determines, in operation 314, that the alert should be presented, the method 300 can proceed to operation 316. At operation 316, the user device 102 can present the alert. As noted above with reference to operation 314, presenting the alert can include visual, audible, tactile, and/or other types of alerts or signals, and as such, operation 316 can include activating various devices associated with the user device 102.

From operation 316, the method 300 proceeds to operation 318. The method 300 also can proceed to operation 318 if the user device 102 determines, in operation 314, that the alert should not be displayed. At operation 318, the user device 102 can determine if any user input should be reported to the server computer 112. The user input can include, for example, user modifications to settings or options associated with the geofence profile 118, the geofence profile management application 108, and/or the geofence profile management data 114. As such, the user device 102 can determine, in operation 318, if any settings or options have been modified at the user device 102, if any privacy settings have been modified at the user device 102, if boundaries or other aspects of the geofence profile 118 have been modified at the user device 102, combinations thereof, or the like.

In some embodiments, the user device 102 can detect, at any time, that a user or other entity has opted out of use of a particular geofence profile 118 and/or that the user has opted-in to use of the geofence profile 118. Thus, operation 318 can correspond to the user device 102 determining if any such changes should be reported to the server computer 112. It should be understood that these examples are illustrative and therefore should not be construed as being limiting in any way.

If the user device 102 determines, in operation 318, that user input should be reported, the method 300 can proceed to operation 320. At operation 320, the user device 102 can report the user input to the server computer 112 and/or the geofence profile management service 110 executed or hosted by the server computer 112. If the user device 102 determines, in operation 318, that the user input should not be reported, the method 300 can return to operation 310. The method 300 also can return to operation 310 from operation 320. The method 300 can be repeated from operation 310 (e.g., flow can proceed from operation 310 through operation 320 again). It should be understood that performance of the method 300 can be repeated any number of times and/or that performance of the method 300 can be terminated at any time.

Figure 4A:
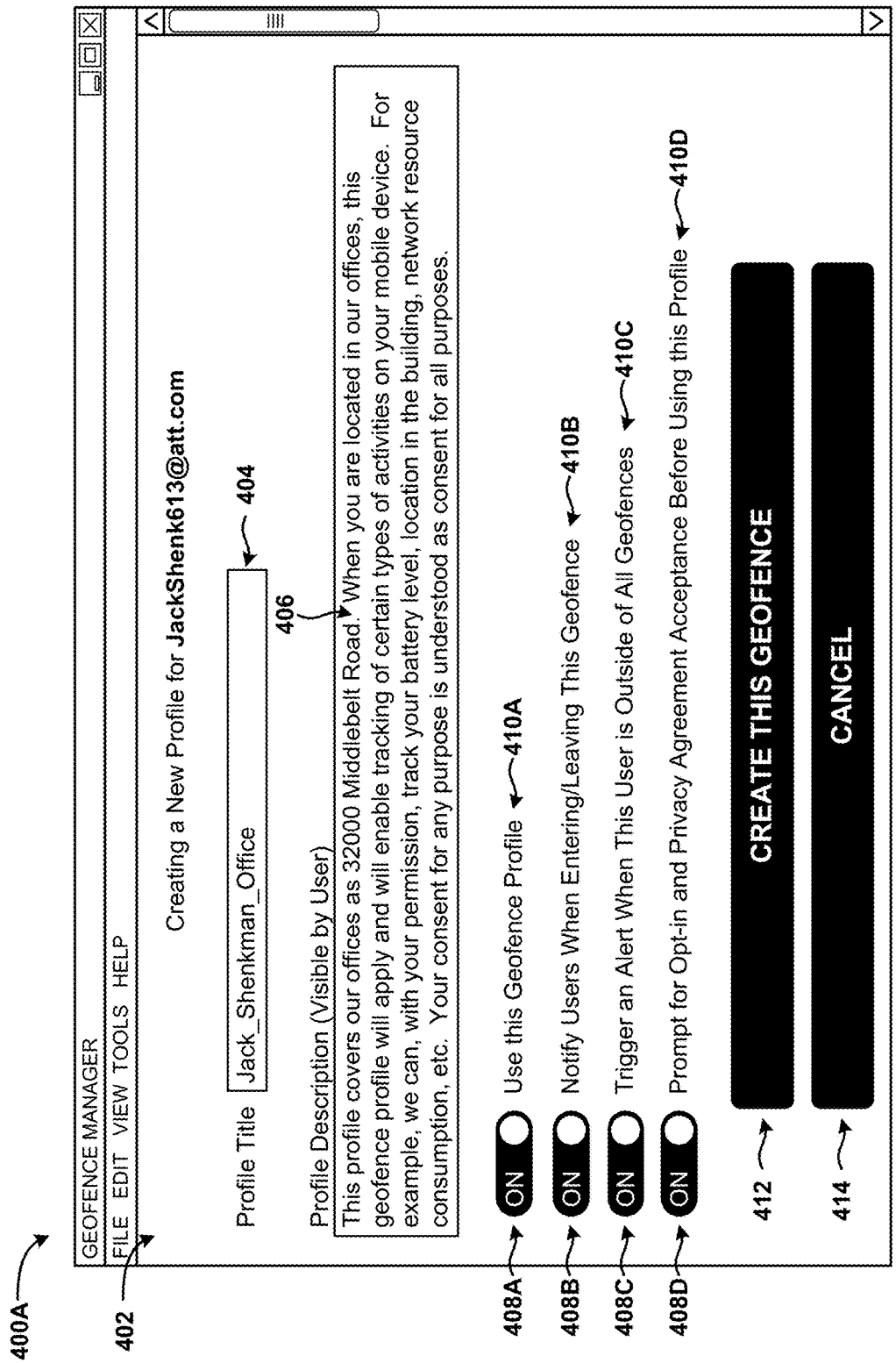
FIGS. 4A-4D are user interface diagrams showing various screen displays for interacting with a geofence profile management service, according to some illustrative embodiments of the concepts and technologies described herein.

FIGS. 4A-4D are user interface ("UI") diagrams showing aspects of UIs for using and/or interacting with a geofence profile management service 110, according to some illustrative embodiments. FIG. 4A shows an illustrative screen display 400A, which can be generated by a device such as the administrator device 116 via interactions with the geofence profile management service 110. According to various embodiments, the administrator device 116 can generate the screen display 400A and/or other screen displays in conjunction with and/or based upon interactions with the geofence profile management service 110 described herein (e.g., via rendering web data provided by a web portal exposed by the geofence profile management service 110, or the like). It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

According to various embodiments, the screen display 400A can be presented, for example, during interactions between an administrator and the geofence profile management service 110, for example during creation of a geofence profile 118 as illustrated and described above with reference to FIG. 2. The screen display 400A also (or alternatively) can be presented in response to detecting a request to modify or edit a geofence profile 118 or at other times. Because the screen display 400A illustrated in FIG. 4A can be displayed at additional and/or alternative times, it should be understood that these examples are illustrative and therefore should not be construed as being limiting in any way.

The screen display 400A can include various menus and/or menu options (not shown in FIG. 4A). The screen display 400A also can include a geofence profile management service options display 402. The geofence profile management service options display 402 can be configured to allow a user or other entity to control various options associated with the geofence profile management service 110 and/or creating a geofence profile 118. As shown in FIG. 4A, the geofence profile management service options display 402 can include a number of fields and/or controls, which are illustrated and described in more detail below.

For example, the geofence profile management service options display 402 can include a geofence title field 404. A user can enter a name for a geofence profile 118 in the geofence title field 404. When the geofence profile 118 is created, the title entered in the geofence title field 404 can be saved as the title for the geofence profile 118. The geofence profile management service options display 402 also can include a profile description field 406. The profile description field 406 can be used to specify a description of the geofence profile 118. A user can determine, based upon the description entered into the profile description field 406, if the user wants to use the geofence profile 118 or not. It should be understood that this example is illustrative and therefore should not be construed as being limiting in any way.

The geofence profile management service options display 402 also can include one or more geofence profile management service setting controls 408A-D (hereinafter collectively and/or generically referred to as "geofence profile management service setting controls 408"). Each of the geofence profile management service setting controls 408 can have a corresponding geofence profile management service setting description 410A-D (hereinafter collectively and/or generically referred to as "geofence profile management service setting descriptions 410").

A user or other entity can interact with the geofence profile management service setting controls 408 to specify one or more options or settings associated with the geofence profile management service 110 and/or the geofence profile management application 108. According to various embodiments, the geofence profile management service setting controls 408 can be replaced with fields, check boxes, dropdown boxes, and/or other controls for setting or controlling geofence profile management service settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the geofence profile management service setting control 408A can be used to enable or disable an option to use the geofence profile 118 being created via the geofence profile management service options display 402; the geofence profile management service setting control 408B can be used to enable or disable an option to provide an alert or other notification to users when the user device 102 enters or leaves boundaries associated with a geofence correspond to the geofence profile 118; the geofence profile management service setting control 408C can be used to enable or disable an option to trigger an alert when the user device 102 is outside of any geofences (associated with any geofence profiles 118) and therefore not being tracked or monitored; and the geofence profile management service setting control 408D can be used to enable or disable an option to prompt a user for an opt-in decision and/or to accept a privacy agreement before using the geofence profile 118. Because additional and/or alternative geofence profile management service setting controls 408 can be included in the geofence profile management service options display 402, it should be understood that these examples are illustrative and therefore should not be construed as being limiting in any way.

The geofence profile management service options display 402 also can include a UI control 412 that, when selected, creates a geofence profile 118 with the title, description, and options specified in geofence profile management service options display 402. It should be understood that the geofence profile management service options display 402 can be displayed at various times other than during creation of a geofence profile 118. For example, the geofence profile management service options display 402 can be presented in response to selection of an "options" control (not shown), or the like. It should be understood that this example is illustrative and therefore should not be construed as being limiting in any way. The geofence profile management service options display 402 also can include a UI control 414 to cancel creation of a geofence profile 118 and/or to exit the geofence profile management service options display 402. Because additional or alternative controls can be included in the geofence profile management service options display 402, it should be understood that the example embodiment shown in FIG. 4A is illustrative and therefore should not be construed as being limiting in any way.

Figure 4B:
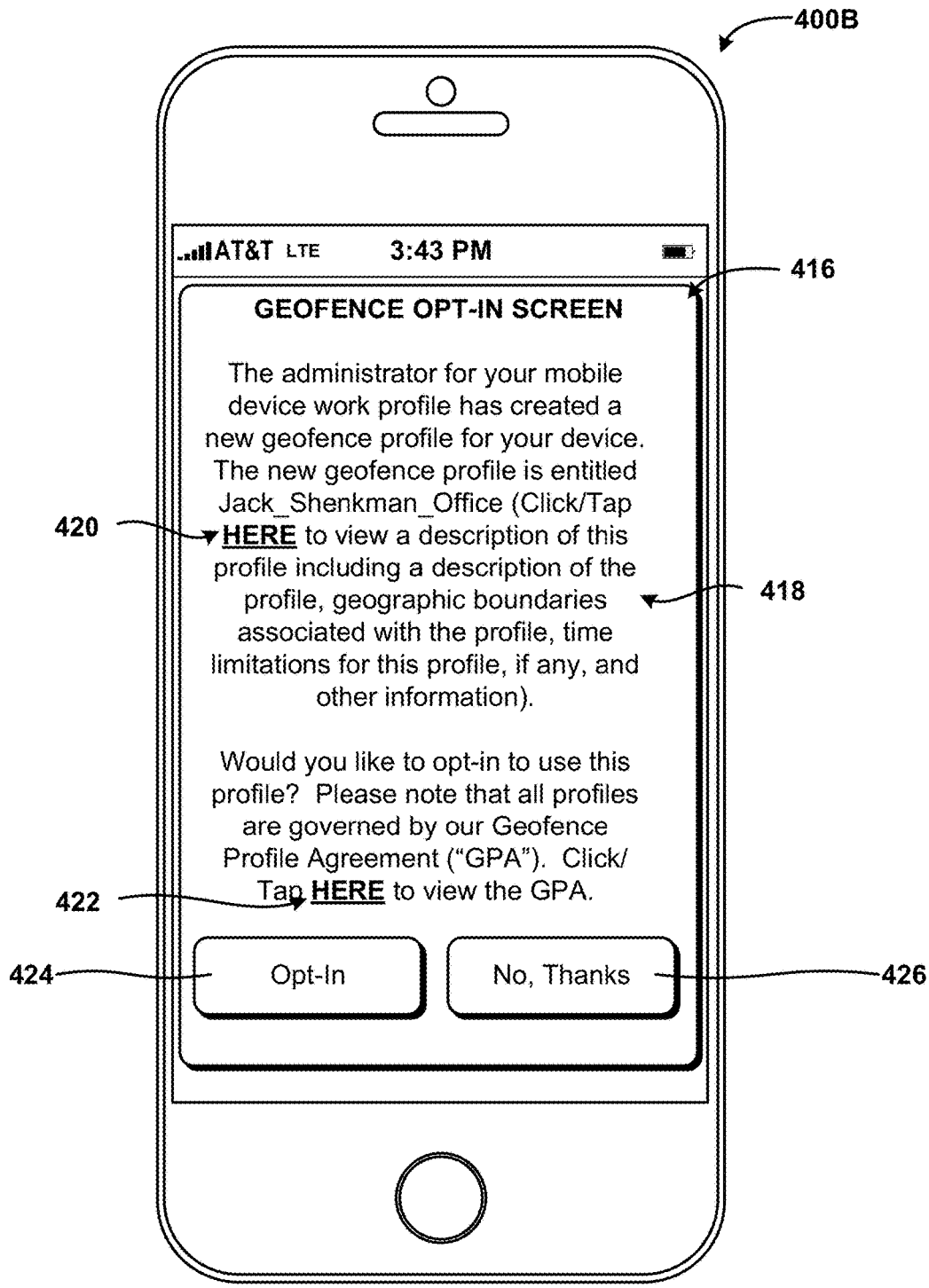

Referring now to FIG. 4B, a UI diagram showing additional aspects of the concepts and technologies disclosed herein for interacting with a geofence profile management application 108 and/or a geofence profile management service 110 is described in detail. In particular, FIG. 4B shows an illustrative screen display 400B, which can be generated by a device such as the user device 102. The screen display 400B can be generated by the user device 102 via execution of the geofence profile management application 108 and/or via interactions with the geofence profile management service 110, in some embodiments. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include a geofence opt-in alert 416. It should be understood that the geofence opt-in alert 416 shown in FIG. 4B is one contemplated embodiment of the alert illustrated and described herein. As shown in FIG. 4B, the geofence opt-in alert 416 can include text 418 that can provide information about a geofence profile 118 that has been provided to the user device 102 and can prompt a user or other entity to indicate whether or not the geofence profile 118 is accepted (e.g., via an opt-in indication) or rejected (e.g., via opting-out). As shown in FIG. 4B, the text 418 can include a link 420 to view a description of the geofence profile 118 and a link 422 to review a geofence profile agreement.

The geofence opt-in alert 416 also can include a user interface control 424 that, if selected by the user or other entity, causes the user device 102 to capture an "opt-in" decision at the user device 102. The geofence opt-in alert 416 also can include a user interface control 426 that, if selected by the user or other entity, causes the user device 102 to capture an "opt-out" decision at the user device 102. As explained at length above, an opt-in decision or an opt-out decision can be provided to the server computer 112 and/or the geofence profile management service 110 hosted or executed thereby. As such, it can be appreciated that via presentation of the geofence opt-in alert 416 and capturing interactions with the geofence opt-in alert 416, the user or other entity can accept or opt-in to use of the geofence profile 118 and/or the user or other entity can reject or opt-out of use of the geofence profile 118. It should be understood that this example is illustrative and therefore should not be construed as being limiting in any way.

Figure 4C:

Referring now to FIG. 4C, a UI diagram showing additional aspects of the concepts and technologies disclosed herein for providing a geofence profile management service 110 is described in detail. In particular, FIG. 4C shows an illustrative screen display 400C, which can be generated by a device such as the user device 102. In some embodiments, the screen display 400C can be generated by the user device 102 via execution of an application program such as the geofence profile management application 108, though this is not necessarily the case. The screen display 400C also can be generated based upon data obtained during or based upon interactions with the geofence profile management service 110, in some embodiments. It should be appreciated that the UI diagram illustrated in FIG. 4C is illustrative of one contemplated example of the UIs that can be generated and/or displayed in accordance with the concepts and technologies disclosed herein, and therefore should not be construed as being limited in any way.

The screen display 400C is illustrated as presenting a view of a web page, though this example is merely illustrative. It should be understood that any activity may be undertaken by the user device 102, if desired. As shown in FIG. 4C, the screen display 400C includes a geofence indicator 430. The geofence indicator 430 shown in FIG. 4C is merely illustrative of one contemplated embodiment and should not be construed as being limiting in any way. The geofence indicator 430 can indicate, to a user or other entity, that the user device 102 is within boundaries associated with a geofence that corresponds to a geofence profile 118. Thus, the presence of the geofence indicator 430 (or the absence thereof, in some embodiments) can indicate to a user that his or her activity is being tracked in accordance with a geofence profile 118. In some other embodiments, presence of the geofence indicator 430 can convey, to a user or other entity, that the user device 102 is outside of any geofences. It should be understood that this example is illustrative and therefore should not be construed as being limiting in any way.

While the embodiment shown in FIG. 4C illustrates a geofence indicator 430 that indicates that the user device 102 is within a geofence, some embodiments of the concepts and technologies described herein include functionality for presenting an alert, indicator, notification, or the like, when the user device 102 leaves boundaries of a geofence (or all geofences associated with all geofence profiles 118). Thus, the geofence indicator 430 or other alerts, screens, displays, or the like can be presented to indicate that the user device 102 is outside of all geofences and therefore indicate that no tracking or monitoring is occurring. It should be understood that this example is illustrative and therefore should not be construed as being limiting in any way.

Figure 4D:
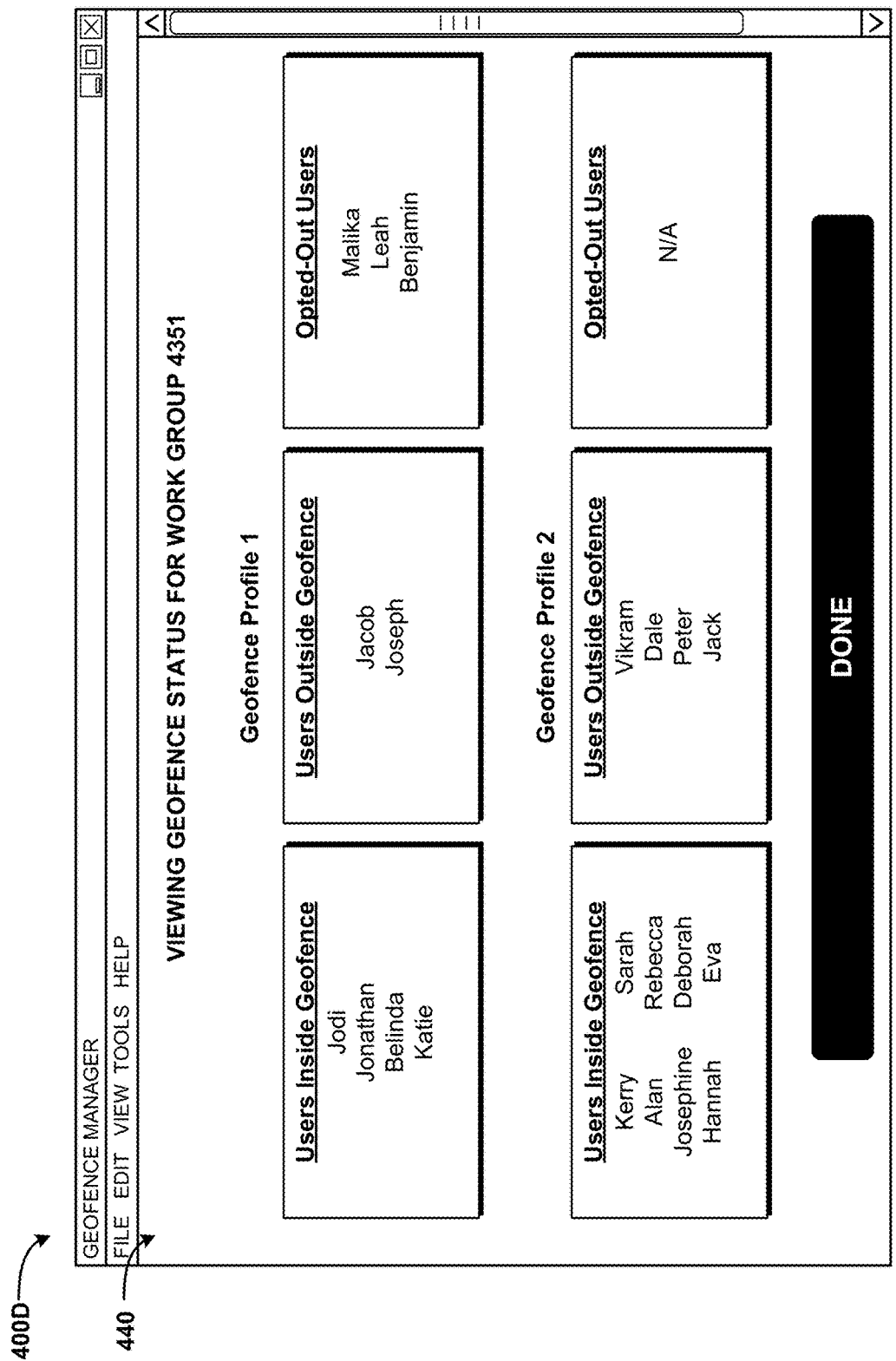

Referring now to FIG. 4D, a UI diagram showing additional aspects of the concepts and technologies disclosed herein for providing a geofence profile management service 110 is described in detail. In particular, FIG. 4D shows an illustrative screen display 400D, which can be generated by a device such as the administrator device 116 via interactions with the geofence profile management service 110. According to various embodiments, the administrator device 116 can generate the screen display 400D and/or other screen displays in conjunction with and/or based upon interactions with the geofence profile management service 110 described herein (e.g., via rendering web data provided by a web portal exposed by the geofence profile management service 110, or the like). It should be appreciated that the UI diagram illustrated in FIG. 4D is illustrative of one contemplated example of the UIs that can be generated and/or displayed in accordance with the concepts and technologies disclosed herein, and therefore should not be construed as being limited in any way.

The screen display 400D can include an administrator geofence profile view 440. It should be understood that the administrator geofence profile view 440 shown in FIG. 4D is one contemplated embodiment of a display that can be viewed by an administrator or other entity to track geofence profile compliance and/or opt-in/opt-out status. As such, the illustrated embodiment should not be construed as being limiting in any way. As shown in FIG. 4D, the administrator geofence profile view 440 can include display information relating to one or more geofence profiles 118. In the illustrated embodiment, information associated with two geofence profiles 118 is shown. Because any number of geofence profiles 118 can be represented by information included in the administrator geofence profile view 440, it should be understood that this example is illustrative and therefore should not be construed as being limiting in any way.

As shown in FIG. 4D, the administrator geofence profile view 440 can show, for each geofence profile 118 represented in the administrator geofence profile view 440, a list of users currently within a geofence associated with the geofence profile 118, a list of users currently outside boundaries of a geofence associated with the geofence profile 118, and a list of users who have opted-out of the associated geofence profile 118. Other information can be displayed as well. For example, some contemplated embodiments of the administrator geofence profile view 440 include information displaying enabled and/or disabled features for the users listed, enabled and/or disabled capabilities for the users, trigger events associated with the users and/or the geofences, privileges associated with the users, combinations thereof, or the like. As such, the administrator geofence profile view 440 can provide an administrator with a high level view of current location status for each user who has accepted the geofence profile 118 without showing specific location for the users. Thus, an administrator (or other entity) can satisfy a need to know where workers are at a particular time (relative to particular geofences) without knowing their exact location. Thus, administrators' management needs can coexist with workers' desire for (and/or right to) privacy. It should be understood that this example is illustrative and therefore should not be construed as being limiting in any way.

Figure 5:
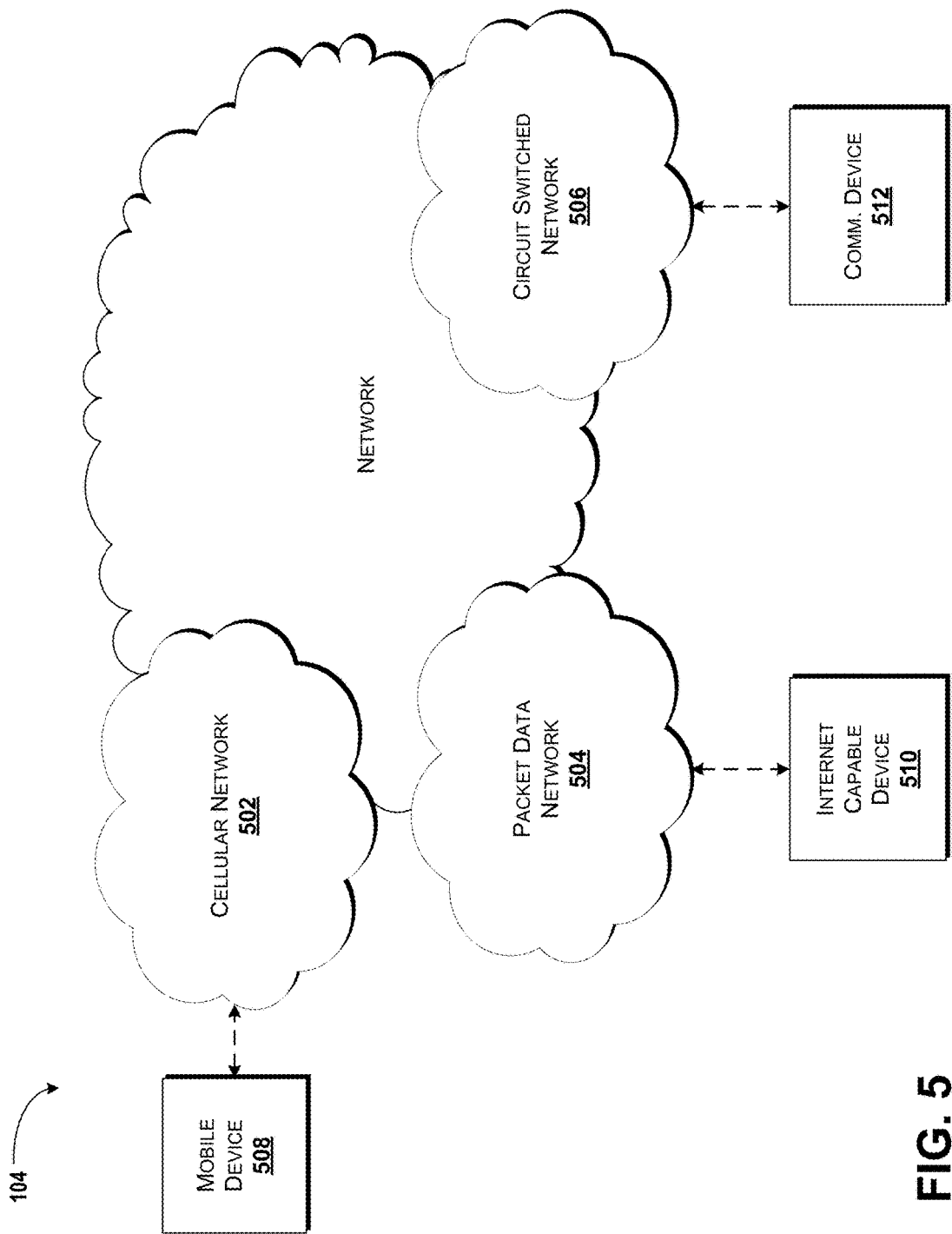
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
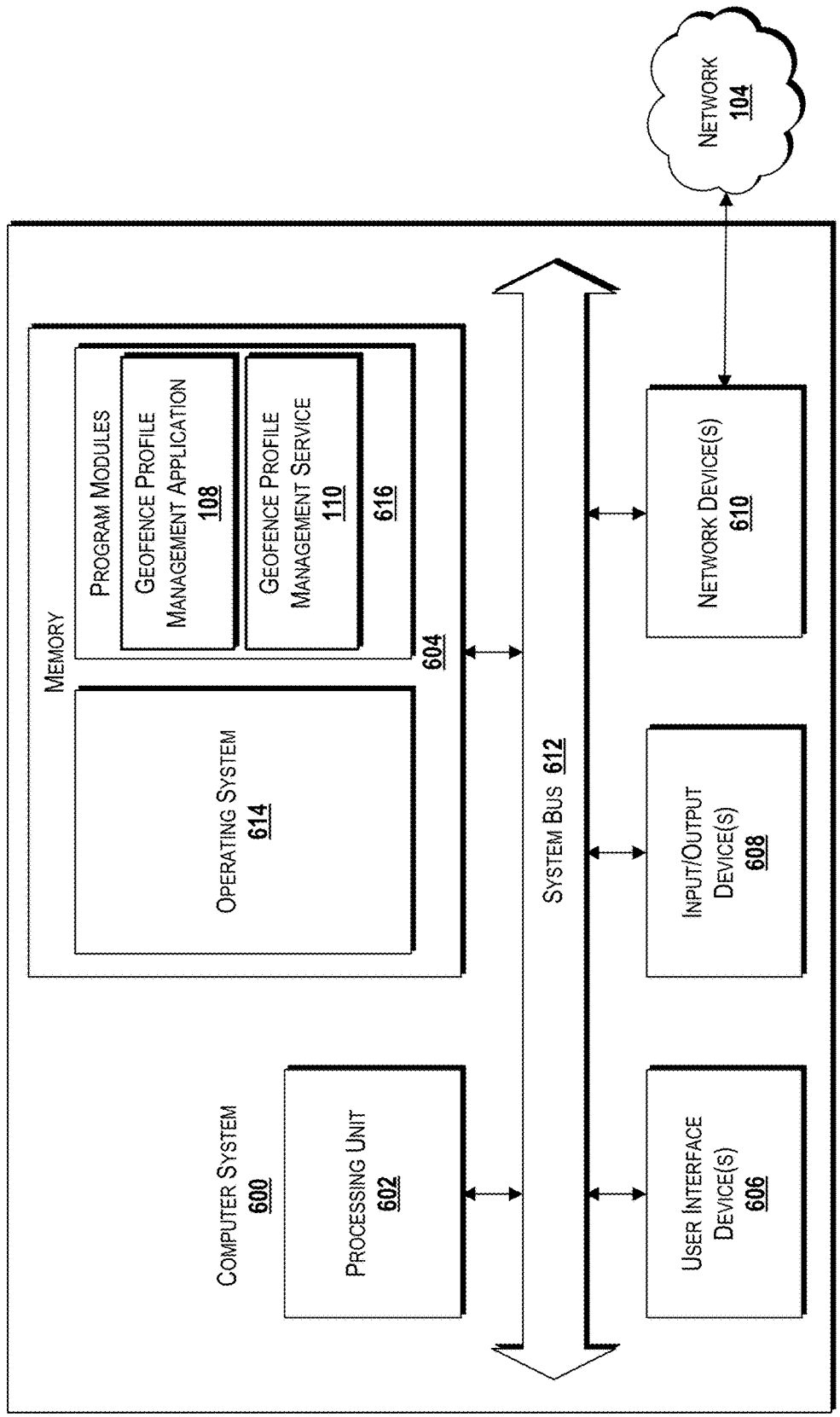
FIG. 6 is a block diagram illustrating an example computer system configured to provide geofence profile management, according to some illustrative embodiments of the concepts and technologies described herein.

FIG. 6 is a block diagram illustrating a computer system 600 configured to provide the functionality described herein for geofence profile management, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the geofence profile management application 108, the geofence profile management service 110, or other applications or modules. These and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the geofence profile management data 114, the geofence profiles 118, the geofence profile data 120, the location information 124, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
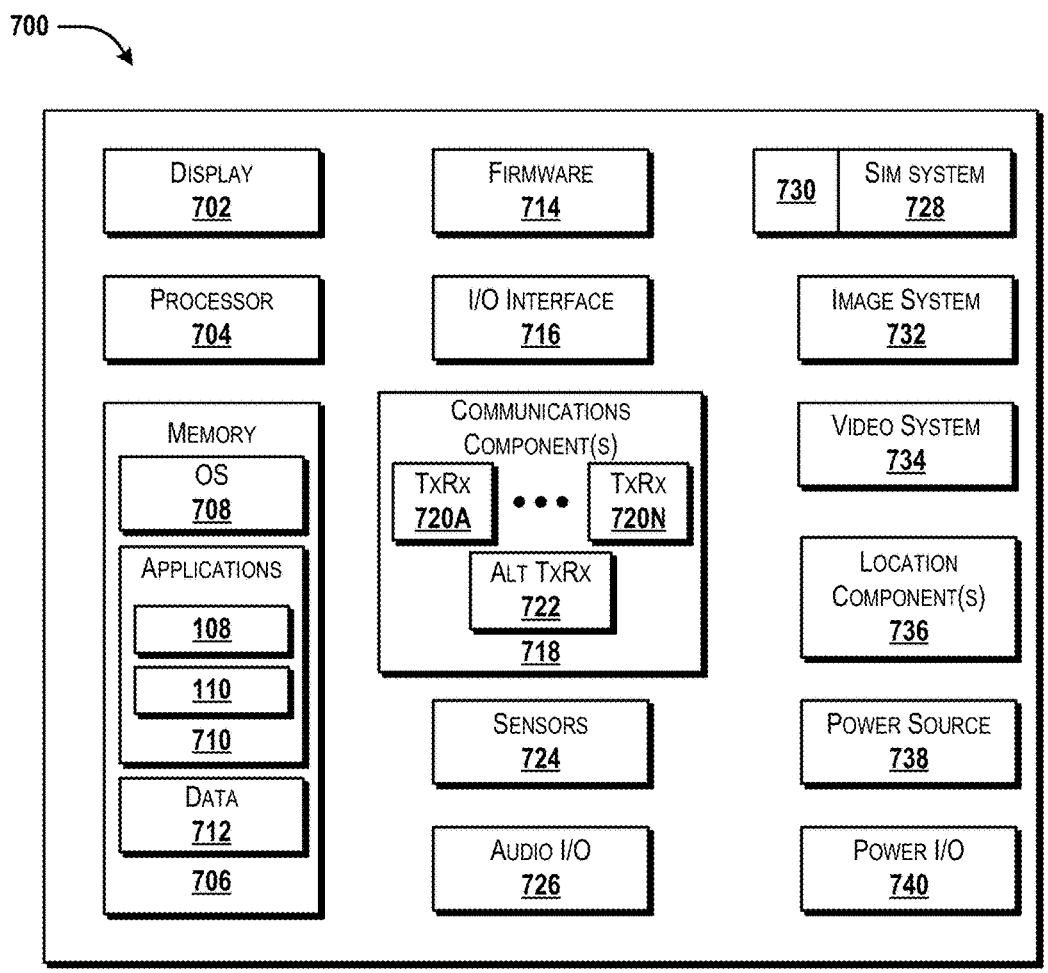
FIG. 7 is a block diagram illustrating an example mobile device configured to interact with a geofence profile management service, according to some illustrative embodiments of the concepts and technologies described herein.

Turning now to FIG. 7, an illustrative mobile device 700 and components thereof will be described. In some embodiments, the user device 102 and/or the administrator device 116 described above with reference to FIG. 1 can be configured as and/or can have an architecture similar or identical to the mobile device 700 described herein in FIG. 7. It should be understood, however, that the user device 102 and/or the administrator device 116 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for UI information from this application, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the geofence profile management application 108, the geofence profile management service 110, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, to creating geofence profiles 118, to viewing alerts associated with a geofence profile 118, to viewing information associated with a geofence profile management application 108, to viewing information associated with a geofence profile management service 110, entering opt-in decisions, entering opt-out decisions, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the geofence profile management data 114, geofence profiles 118, the geofence profile data 120, the location information 124, and/or other applications or program modules.

According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information 124, geofence profiles 118, geofence profile management data 114, geofence profile data 120, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700.

In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for geofence profile management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, at a computer comprising a processor, geofence profile data, wherein the geofence profile data is received from an administrator device;
creating, by the computer and based on the geofence profile data, a geofence profile comprising a geofence profile description and a geofence profile option, wherein the geofence profile option comprises an option to display an alert when a user device enters boundaries associated with a geofence that corresponds to the geofence profile;
providing, by the computer, the geofence profile to the user device;
receiving, by the computer, data that indicates an opt-in associated with the user device, the opt-in relating to use of the geofence profile;
determining, by the computer and based on the data that indicates the opt-in, that the user device accepts the geofence profile; and
activating, by the computer, the geofence profile in response to the receiving the data that indicates the opt-in.

2. The method of claim 1, wherein the geofence profile description comprises text that describes the geofence profile.

3. The method of claim 1, wherein receiving the data further indicates that a prompt was presented at the user device, the prompt comprising a user control that corresponds to an option to opt-in to the use of the geofence profile.

4. The method of claim 1, wherein the user device presents a geofence indicator that indicates that the user device is within the boundaries of the geofence that corresponds to the geofence profile.

5. The method of claim 1, wherein the user device presents a geofence indicator that indicates that the user device is outside the boundaries of the geofence that corresponds to the geofence profile.

6. The method of claim 1, wherein the user device presents a geofence indicator that indicates that the user device is outside of boundaries associated with any geofence and is not being monitored.

7. The method of claim 1, wherein activating the geofence profile comprises informing, by the computer, the user device to begin use of the geofence profile.

8. The method of claim 7, wherein the user device tracks location and applies the geofence profile based upon the location that is tracked.

9. The method of claim 1, further comprising:
receiving, from the user device, user input; and
updating the geofence profile based upon the user input.

10. The method of claim 1, wherein the geofence profile option comprises a further option to display a further alert when the user device exits the boundaries associated with the geofence that corresponds to the geofence profile.

11. A system comprising:
a computer comprising a processor; and
a memory that stores computer-executable instructions that, when executed by the processor, cause the processor to perform operations comprising
receiving geofence profile data from an administrator device,
creating, based on the geofence profile data, a geofence profile that comprises a geofence profile description and a geofence profile option, wherein the geofence profile option comprises an option to display an alert when a user device enters boundaries associated with a geofence that corresponds to the geofence profile,
providing, to the user device, the geofence profile,
determining that the user device accepts the geofence profile, wherein the determining is in response to receiving data that indicates an opt-in decision by the user device, wherein receiving the opt-in decision indicates that an input to opt-in to use of the geofence profile was detected, and
activating the geofence profile in response to the user device accepting the geofence profile.

12. The system of claim 11, wherein the geofence profile description comprises text that describes the geofence profile.

13. The system of claim 11, wherein receiving the data further indicates that a prompt was presented at the user device, the prompt comprising a user control that corresponds to an option to opt-in to the use of the geofence profile.

14. The system of claim 11, wherein the user device presents a geofence indicator that indicates one of a first indication that the user device is within the boundaries of the geofence that corresponds to the geofence profile, a second indication that the user device is outside the boundaries of the geofence, and a third indication that the user device is outside of boundaries associated with any geofence and is not being monitored.

15. The system of claim 11, wherein the geofence profile option comprises a further option to display a further alert when the user device exits the boundaries associated with the geofence that corresponds to the geofence profile.

16. A computer storage medium having computer-executable instructions stored thereon that, when executed by a processor, cause the processor to perform operations comprising:
receiving, at a computer, geofence profile data from an administrator device;
creating, based on the geofence profile data, a geofence profile that comprises a geofence profile description and a geofence profile option, wherein the geofence profile option comprises an option to display an alert when a user device enters boundaries associated with a geofence that corresponds to the geofence profile;
providing, to the user device, the geofence profile;
determining that the user device accepts the geofence profile, wherein the determining is in response to receiving data that indicates an opt-in decision by the user device, wherein receiving the opt-in decision indicates that an input to opt-in to use of the geofence profile was detected; and
activating the geofence profile in response to the user device accepting the geofence profile.

17. The computer storage medium of claim 16, wherein the geofence profile description comprises text that describes the geofence profile.

18. The computer storage medium of claim 16, wherein receiving the data further indicates that a prompt was presented at the user device, the prompt comprising a user control that corresponds to an option to opt-in to the use of the geofence profile.

19. The computer storage medium of claim 16, wherein the user device presents a geofence indicator that indicates one of a first indication that the user device is within the boundaries of the geofence that corresponds to the geofence profile, a second indication that the user device is outside the boundaries of the geofence, and a third indication that the user device is outside of boundaries associated with any geofence and is not being monitored.

20. The computer storage medium of claim 16, wherein the geofence profile option comprises a further option to display a further alert when the user device exits the boundaries associated with the geofence that corresponds to the geofence profile.

* * * * *